(12) United States Patent
Satou et al.

(10) Patent No.: US 7,354,053 B2
(45) Date of Patent: Apr. 8, 2008

(54) INDEPENDENT SUSPENSION FOR VEHICLE

(75) Inventors: Masaharu Satou, Tokyo (JP); Hajime Katou, Kanagawa (JP); Mineki Ri, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 292 days.

(21) Appl. No.: 11/180,601

(22) Filed: Jul. 14, 2005

(65) Prior Publication Data

US 2006/0012142 A1 Jan. 19, 2006

(30) Foreign Application Priority Data

Jul. 15, 2004 (JP) .............................. 2004-208829

(51) Int. Cl.
*B60G 3/26* (2006.01)

(52) U.S. Cl. ......................... 280/124.135; 280/124.122

(58) Field of Classification Search ........... 280/124.15, 280/124.152, 124.135, 124.143, 124.144, 280/124.134, 124.11, 124.111, 124.114, 124.117, 280/124.121, 124.122, 86.75, 86.754, 86.758
See application file for complete search history.

(56) References Cited

U.S. PATENT DOCUMENTS

| | | | | |
|---|---|---|---|---|
| 3,195,914 A | * | 7/1965 | Rosky ................. | 280/124.142 |
| 3,422,918 A | * | 1/1969 | Musser, Jr. et al. ...... | 280/86.75 |
| 4,157,840 A | * | 6/1979 | Kroniger et al. ....... | 280/124.134 |
| 4,440,420 A | * | 4/1984 | Muller ................. | 280/124.135 |
| 5,513,874 A | * | 5/1996 | Mori ....................... | 280/93.51 |
| 5,516,130 A | * | 5/1996 | Mitchell .............. | 280/124.134 |
| 5,845,926 A | * | 12/1998 | Davis et al. .......... | 280/124.136 |
| 6,000,706 A | * | 12/1999 | Boberg et al. ........ | 280/124.135 |
| 6,116,627 A | | 9/2000 | Kawabe et al. | |
| 6,302,420 B1 | * | 10/2001 | Sano .................... | 280/124.134 |
| 6,719,314 B1 | * | 4/2004 | Schote ............... | 280/124.135 |
| 7,125,028 B2 | * | 10/2006 | Ham .................... | 280/124.134 |
| 2004/0100062 A1 | * | 5/2004 | Inoue et al. .......... | 280/124.135 |
| 2004/0169347 A1 | * | 9/2004 | Seki ..................... | 280/124.134 |
| 2005/0127634 A1 | * | 6/2005 | Gerrard ............... | 280/124.143 |
| 2006/0012142 A1 | * | 1/2006 | Satou et al. ........... | 280/124.15 |
| 2007/0001420 A1 | * | 1/2007 | Schmidt et al. ....... | 280/124.134 |
| 2007/0085295 A1 | * | 4/2007 | Johnson et al. ....... | 280/124.152 |

FOREIGN PATENT DOCUMENTS

JP        10-109510 A        4/1998

* cited by examiner

*Primary Examiner*—Paul N. Dickson
*Assistant Examiner*—Karen J. Amores
(74) *Attorney, Agent, or Firm*—Foley & Lardner LLP

(57) ABSTRACT

An independent suspension for a vehicle, including upper and lower arms pivotally moveable in a vertical direction of the vehicle, an axle with a wheel center which is connected with the upper and lower arms, and a tie rod connected with the axle at a connection point rearward of the wheel center in a fore-and-aft direction of the vehicle. The lower arm is connected to the vehicle body at front and rear connection points spaced from each other in the fore-and-aft direction of the vehicle through front and rear pivot shafts with bushings. The central axis of the front pivot shaft is inclined relative to the central axis of the rear pivot shaft in a toe-in direction of the wheel.

10 Claims, 8 Drawing Sheets

INDEPENDENT SUSPENSION FOR VEHICLE

BACKGROUND OF THE INVENTION

The present invention relates to an independent suspension for supporting wheels of a vehicle independently, and specifically to an independent suspension capable of enhancing steering stability of the vehicle.

There has been conventionally proposed various kinds of a so-called double wishbone independent front suspension in which a wheel supporting axle is connected to a vehicle body through A-shaped upper and lower links each connected to the vehicle body at two connection points in a fore-and-aft direction of the vehicle. Japanese Patent Application First Publication No. 10-109510 shows an example of such independent front suspensions.

FIG. 9 schematically shows a relationship between wheel center W/C on axle 51 and two connection points at which upper link 52 and lower link 53 are each connected to a vehicle body, in the double wishbone independent front suspension. As shown in FIG. 9, wheel center W/C on axle 51 is located in a lower link-side position offset from a midpoint between connection point 54 of upper link 52 and connection point 55 of lower link 53 toward lower link 53. In addition, in the double wishbone independent front suspension, a tie rod of a steering system, not shown, is disposed rearward of wheel center W/C on axle 51 in a fore-and-aft direction of the vehicle. Connection point 55 between axle 51 and lower link 53 is disposed forward of wheel center W/C on axle 51 in the fore-and-aft direction of the vehicle. Further, lower link 53 is connected to the vehicle body at front and rear connection points 56 and 57 through pivot shafts with bushings. The front bushing has a higher rigidity in a width direction of the vehicle as compared to that of the rear bushing, thereby serving for enhancing the rigidity in the width direction of the vehicle.

SUMMARY OF THE INVENTION

However, the independent front suspension has the following problem. As illustrated in FIG. 9, when a force is applied to the contact point of wheel W on the ground from the front side of the vehicle in a fore-and-aft direction of the vehicle upon a braking operation, wheel center W/C receives a force input in the same direction as that of the force applied to the contact point of wheel W. In this condition, connection point 55 between lower link 53 and axle 51 also receives a force as indicated at F in FIG. 9, input in the same direction as that of the force applied to the contact point of wheel W. Due to force F input to connection point 55, as shown in FIG. 10, forces Fy56 and Fy57 directed rearward of the vehicle are applied to front connection point 56 and rear connection point 57 between lower link 53 and the vehicle body, respectively. Further, force F input to connection point 55 causes a moment directed to lower link 53, whereby forces Fx56 and Fx57 directed outward and inward in the width direction of the vehicle are applied to front and rear connection points 56 and 57 between lower link 53 and the vehicle body, respectively. Here, a relationship between force F, forces Fy56 and Fy57 and forces Fx56 and Fx57 is represented by the following formulae:

$$F=Fy56+Fy57$$

$$Fx56=Fx57$$

The front bushing at front connection point 56 has the rigidity higher than that of the rear bushing at rear connection point 57 in the width direction of the vehicle as described above. Owing to the difference in the rigidity between the front and rear bushings, front connection point 56 and rear connection point 57 are moved to a position as indicated by mark • in FIG. 11. As shown in FIG. 11, front connection point 56 is displaced by force Fx56 outward in the width direction of the vehicle to a small extent, and rear connection point 57 is displaced by force Fx57 inward in the width direction thereof to a large extent. As a result, lower link 53 is turned about center of turn C present on the front side of the vehicle, so that connection point 55 between lower link 53 and axle 51 is displaced inward in the width direction of the vehicle.

In addition, as shown in FIG. 12, tie rod T of a steering system is connected with axle 51 at connection point 58 that is disposed rearward of connection point 55. Tie rod T has pivot center CT that is disposed rearward of connection point 58 and lies in a horizontal plane. Tie rod T pivotally moves about pivot center CT. When force F is applied to tie rod T, connection point 58 is displaced outward in the width direction of the vehicle to a position as indicated by mark • in FIG. 12.

Owing to the inward displacement of connection point 55 between lower link 53 and axle 51 and the outward displacement of connection point 58 between tie rod T and axle 51 as explained above, axle 51 and wheel W tend to be brought into a toe-in state as shown in FIG. 13. In such a case, oversteer will occur during a vehicle steering operation, causing the vehicle steering stability to be deteriorated.

In order to solve the above problem, the rigidity of the rear bushing at rear connection point 57 may be increased to thereby reduce an amount of the inward displacement of rear connection point 57. However, in this case, vibration of the wheels tends to be transmitted to the vehicle body, resulting in deterioration of riding comfort of the vehicle. Alternatively, the rigidity of the front bushing at front connection point 56 may be reduced to thereby increase an amount of the outward displacement of front connection point 56. In this case, the rigidity of lower link 53 in the width direction of the vehicle which is required for supporting axle 51, cannot be ensured, thereby causing deterioration of the vehicle steering stability.

It is an object of the present invention to overcome the above problems and provide an independent suspension for a vehicle which is capable of preventing wheels from coming into a toe-in state without decreasing riding comfort of the vehicle, to thereby enhance the vehicle steering stability.

In one aspect of the present invention, there is provided an independent suspension for a vehicle, comprising:

an upper arm adapted to be connected to a vehicle body of the vehicle so as to be pivotally moveable in a vertical direction of the vehicle;

a lower arm adapted to be connected to the vehicle body of the vehicle at front and rear connection points spaced from each other in a fore-and-aft direction of the vehicle;

a front pivot shaft with a bushing, the front pivot shaft being disposed at the front connection point between the lower arm and the vehicle body, the front pivot shaft having a central axis passing through the front connection point between the lower arm and the vehicle body;

a rear pivot shaft with a bushing, the rear pivot shaft being disposed at the rear connection point between the lower arm and the vehicle body, the rear pivot shaft having a central axis passing through the rear connection point between the lower arm and the vehicle body, the lower arm being pivotally moveable about the central axes of the front and rear pivot shafts in the vertical direction of the vehicle;

an axle on which a wheel of the vehicle is rotatably supported and a wheel center is positioned, the axle being connected with the upper arm and the lower arm; and a tie rod connected with the axle at a connection point rearward of the wheel center in the fore-and-aft direction of the vehicle, wherein the central axis of the front pivot shaft is inclined relative to the central axis of the rear pivot shaft in a toe-in direction of the wheel.

In a further aspect of the present invention, there is provided an independent suspension for a vehicle, the independent wheel suspension comprising:

an upper arm adapted to be connected to a vehicle body of the vehicle so as to be pivotally moveable in a vertical direction of the vehicle;

a lower arm adapted to be connected to the vehicle-body of the vehicle at front and rear connection points spaced from each other in a fore-and-aft direction of the vehicle;

a front pivot shaft with a bushing, the front pivot shaft being disposed at the front connection point between the lower arm and the vehicle body, the front pivot shaft having a central axis passing through the front connection point between the lower arm and the vehicle body;

a rear pivot shaft with a bushing, the rear pivot shaft being disposed at the rear connection point between the lower arm and the vehicle body, the rear pivot shaft having a central axis passing through the rear connection point between the lower arm and the vehicle body, the lower arm being pivotally moveable about the central axes of the front and rear pivot shafts in the vertical direction of the vehicle;

an axle on which a wheel of the vehicle is rotatably supported and a wheel center is positioned, the axle being connected with the upper arm and the lower arm; and a tie rod connected with the axle at a connection point rearward of the wheel center in the fore-and-aft direction of the vehicle, wherein the front connection point between the lower arm and the vehicle body is outwardly offset from the central axis of the rear pivot shaft in a width direction of the vehicle substantially perpendicular to the fore-and-aft direction thereof.

In a still further aspect of the present invention, there is provided an independent suspension for a vehicle, comprising:

an axle on which a wheel of the vehicle is rotatably supported and a wheel center is positioned;

a first link means for connecting the axle to a vehicle body of the vehicle at front and rear connection points spaced from each other in a fore-and-aft direction of the vehicle;

a first pivot means for supporting the first link means at the front connection point between the first link means and the vehicle body so as to be pivotally moveable about a first central axis passing through the front connection point in a vertical direction of the vehicle;

a second pivot means for supporting the first link means at the rear connection point between the first link means and the vehicle body so as to be pivotally moveable about a second central axis passing through the rear connection point in the vertical direction of the vehicle; and a tie rod connected with the axle at a connection point rearward of the wheel center in the fore-and-aft direction of the vehicle, wherein the first central axis is inclined relative to the second central axis in a toe-in direction of the wheel.

In a still further aspect of the present invention, there is provided an independent suspension for a vehicle, comprising:

an axle on which a wheel of the vehicle is rotatably supported and a wheel center is positioned;

a first link means for connecting the axle to a vehicle body of the vehicle at front and rear connection points spaced from each other in a fore-and-aft direction of the vehicle;

a first pivot means for supporting the first link means at the front connection point between the first link means and the vehicle body so as to be pivotally moveable about a first central axis passing through the front connection point in a vertical direction of the vehicle;

a second pivot means for supporting the first link means at the rear connection point between the first link means and the vehicle body so as to be pivotally moveable about a second central axis passing through the rear connection point in the vertical direction of the vehicle; and a tie rod connected with the axle at a connection point rearward of the wheel center in the fore-and-aft direction of the vehicle, wherein the front connection point between the lower arm and the vehicle body is outwardly offset from the central axis of the rear pivot shaft in a width direction of the vehicle substantially perpendicular to the fore-and-aft direction thereof.

DETAILED DESCRIPTION OF THE INVENTION

Figure 1:
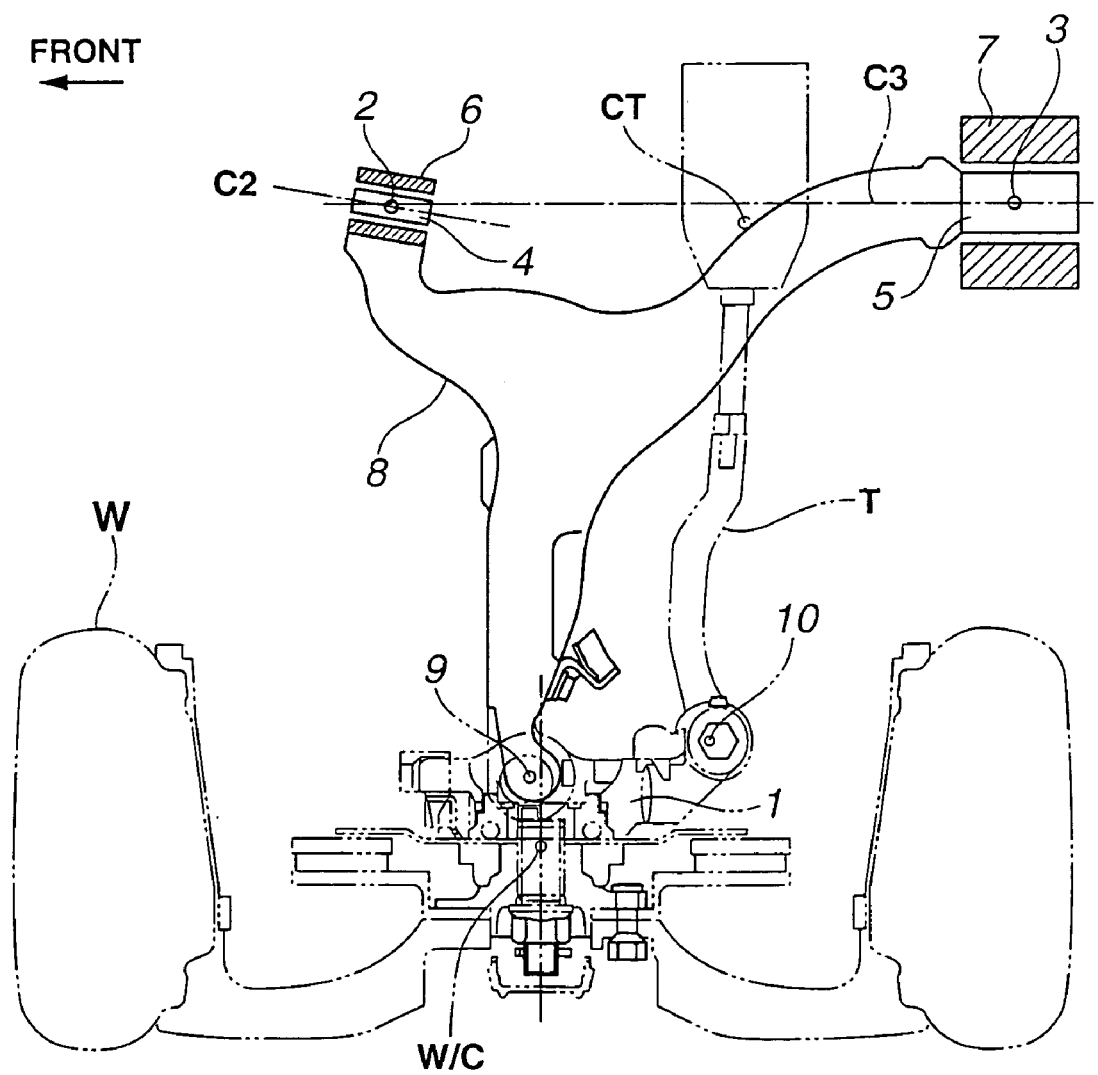
FIG. 1 is a schematic top plan view of an essential part of an independent suspension for a vehicle, of a first embodiment according to the present invention.

Referring to FIG. 1, there is shown a schematic top plan view of an independent suspension for a vehicle, according to a first embodiment of the present invention. As illustrated in FIG. 1, the independent suspension includes axle 1 on which wheel W is rotatably supported, lower arm 8 and tie rod T which are connected with axle 1, respectively. Lower arm 8 has a bifurcated shape, i.e., a so-called A-shape. Lower arm 8 includes two inside end portions spaced apart from each other in a fore-and-aft direction of the vehicle and disposed inward in a width direction of the vehicle substantially perpendicular to the fore-and-aft direction, and one outside end portion disposed outward in the width direction. The inside end portions of lower arm 8 are connected to a vehicle body of the vehicle at front connection point 2 and rear connection point 3 which are spaced from each other in the fore-and-aft direction of the vehicle. Lower arm 8 is pivotally supported by pivot shafts 4 and 5 with bushings 6 and 7 which are disposed at front and rear connection points 2 and 3, in a vertical direction of the vehicle, namely, in an up-and-down direction of the vehicle. Lower arm 8 thus acts as a link member that connects axle 1 to the vehicle body so as to be pivotally moveable in the vertical direction of the vehicle. Axle 1 is connected with the outside end portion of lower arm 8 at connection point 9 through a ball joint. Connection point 9 is disposed forward of wheel center W/C positioned on axle 1. Axle 1 also is connected with tie rod T at connection point 10. Connection point 10 is disposed rearward of wheel center W/C on axle 1. Tie rod T is connected to a vehicle body-side member and pivotally moveable about pivot center CT in a horizontal plane. An upper arm is connected to the vehicle body so as to be pivotally moveable in the vertical direction of the vehicle. The upper arm acts as a link member that connects axle 1 to the vehicle body so as to be pivotally moveable in the vertical direction of the vehicle.

Front pivot shaft 4 has a cylindrical shape and central axis C2 passing through front connection point 2 between lower arm 8 and the vehicle body. Front bushing 6 having a hollow-cylindrical shape receives front pivot shaft 4 and is disposed coaxially with front pivot shaft 4. Similarly, rear pivot shaft 5 has a cylindrical shape and central axis C3 that passes through rear connection point 3 between lower arm 8 and the vehicle body and extends substantially along the fore-and-aft direction of the vehicle. Rear bushing 7 having a hollow-cylindrical shape receives rear pivot shaft 5 and is disposed coaxially with rear pivot shaft 5. Central axis C2 of front pivot shaft 4 is inclined relative to central axis C3 of rear pivot shaft 5 in a toe-in direction of wheel W, namely, inwardly in the width direction of the vehicle. Specifically, central axis C2 is directed at a front side thereof toward an inside of the vehicle and at a rear side thereof toward an outside of the vehicle. Further, front connection point 2 is present at a center of front pivot shaft 4 which lies in a horizontal plane. Rear connection point 3 is present at a center of rear pivot shaft 5 which lies in the same horizontal plane. Lower arm 8 is pivotally moveable about a straight line connecting front and rear connection points 2 and 3 as a pivot axis.

Figure 2:
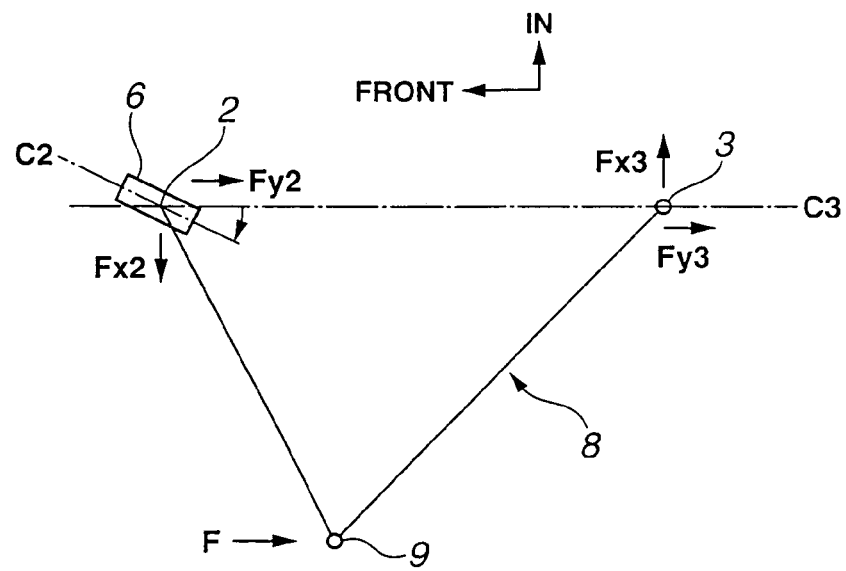
FIG. 2 is a schematic explanatory top plan view of the independent suspension shown in FIG. 1, illustrating connection points between a lower arm, an axle and a vehicle body and forces applied to the connection points upon a braking operation.

Referring to FIG. 2, there is schematically shown a positional relationship between front and rear connection points 2 and 3 between lower arm 8 and the vehicle body, connection point 9 between lower arm 8 and axle 1, front bushing 6, and forces applied thereto upon a braking operation in the vehicle. Force F is exerted on connection point 9 through the ball joint upon the braking operation. This causes forces Fy2 and Fy3 directed rearward in the fore-and-aft direction of the vehicle to be applied to front connection point 2 and rear connection point 3, respectively. Simultaneously, a moment of force F is applied to front and rear connection points 2 and 3, thereby causing Fx2 directed outward in the width direction of the vehicle and Fx3 directed inward in the width direction thereof to be applied to front connection point 2 and rear connection point 3, respectively. Here, the relationship between force F and forces Fy2 and Fy3 and the relationship between forces Fx2 and Fx3 are represented by the following formulae:

$$F = Fy2 + Fy3$$

$$Fx2 = Fx3$$

Figure 3:
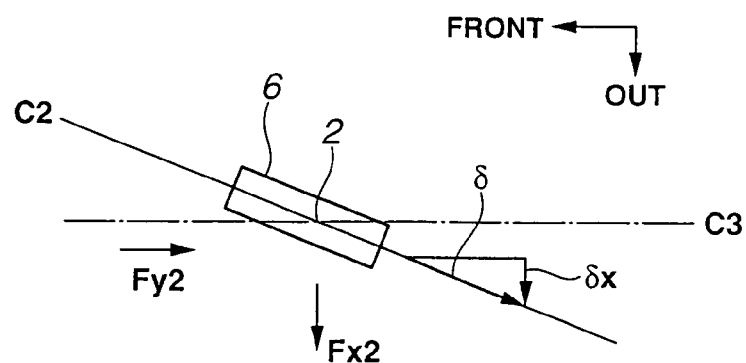
FIG. 3 is a view similar to FIG. 2, but illustrating a front bushing disposed on a front side of the vehicle and forces applied to the front bushing.

Referring to FIG. 3, there are shown forces Fx2 and Fy2 applied to front bushing 6 and displacement of front bushing 6 and front connection point 2 which is caused by forces Fx2 and Fy2 upon the braking operation in the vehicle. When force Fy2 directed rearward in the fore-and-aft direction of the vehicle is applied to front connection point 2 upon the braking operation as explained above, front bushing 6 undergoes force Fy2 directed rearward in the fore-and-aft direction and suffers from shear deformation δ in a direction of central axis C2. Since shear rigidity of front bushing 6 in the direction of central axis C2 is small, shear deformation δ becomes large. This causes front connection point 2 and front bushing 6 to be largely displaced by an amount δx outwardly in the width direction of the vehicle. Front bushing 6 also undergoes force Fx2 directed outward in the width direction of the vehicle, and thereby is radially deformed and compressed. However, since tubular front bushing 6 has a large compression rigidity in the radial direction, an amount of the compressive deformation is very slight. Therefore, in FIG. 3, illustration of a displacement of front bushing 6 due to the compressive deformation is omitted.

Figure 4:
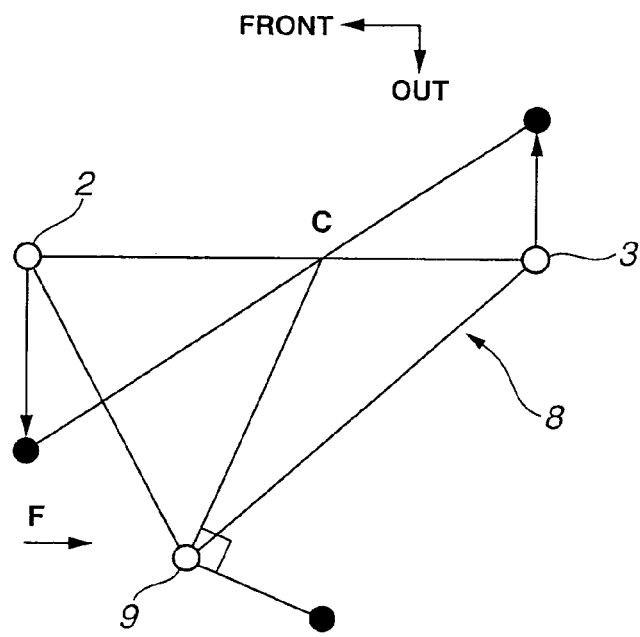
FIG. 4 is a view similar to FIG. 2, but illustrating a behavior of the lower arm.

Referring to FIG. 4, there is shown displacement of front and rear connection points 2 and 3 between lower arm 8 and the vehicle body and connection point 9 between lower arm 8 and axle 1, which is caused by force F applied to connection point 9 upon the braking operation. As explained above, when force F is applied to connection point 9 between lower arm 8 and axle 1 upon the braking operation, front connection point 2 is largely displaced outwardly in the width direction of the vehicle from the position as indicated by mark ○ to the position as indicated by mark in FIG. 4. On the other hand, when force F is applied to connection point 9 between lower arm 8 and axle 1 upon the braking operation, rear connection point 3 is displaced inwardly in the width direction of the vehicle by an amount smaller than that of displacement of front connection point 2 which is caused by force Fx3. As a result, as shown in FIG. 4, lower arm 8 is turned about center of turn C located rearward of connection point 9, so that connection point 9 is displaced outwardly in the width direction of the vehicle from the position as indicated by mark ○ to the position as indicated by mark •.

Figure 5:
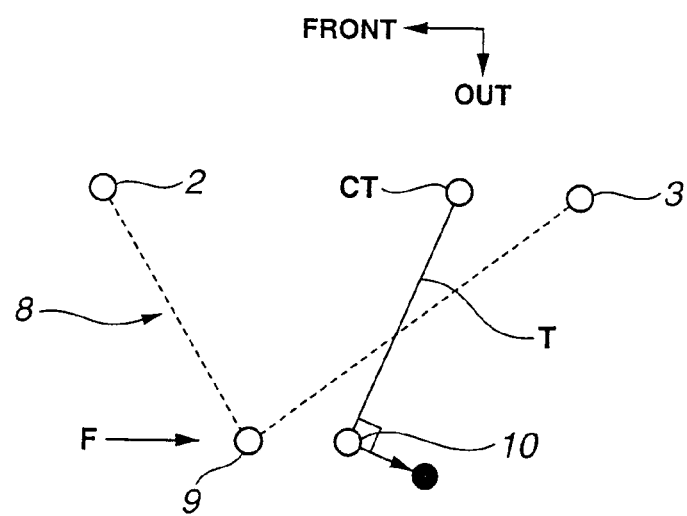
FIG. 5 is a view similar to FIG. 2, but illustrating a behavior of the axle.

Referring to FIG. 5, there is shown displacement of connection point 10 between axle 1 and tie rod T upon a braking operation in the vehicle. Connection point 10 is disposed in the position as indicated by mark ○ in FIG. 5, which is offset rearward from connection point 9 between lower arm 8 and axle 1 in the fore-and-aft direction of the vehicle. Pivot center CT of tie rod T which lies in the horizontal plane is positioned rearward of connection point 10 in the fore-and-aft direction of the vehicle. When force F is applied to connection point 9 upon the braking operation, tie rod T is turned about pivot center CT so that connection point 10 is displaced outwardly in the width direction of the vehicle to the position as indicated by mark • in FIG. 5.

Figure 6:
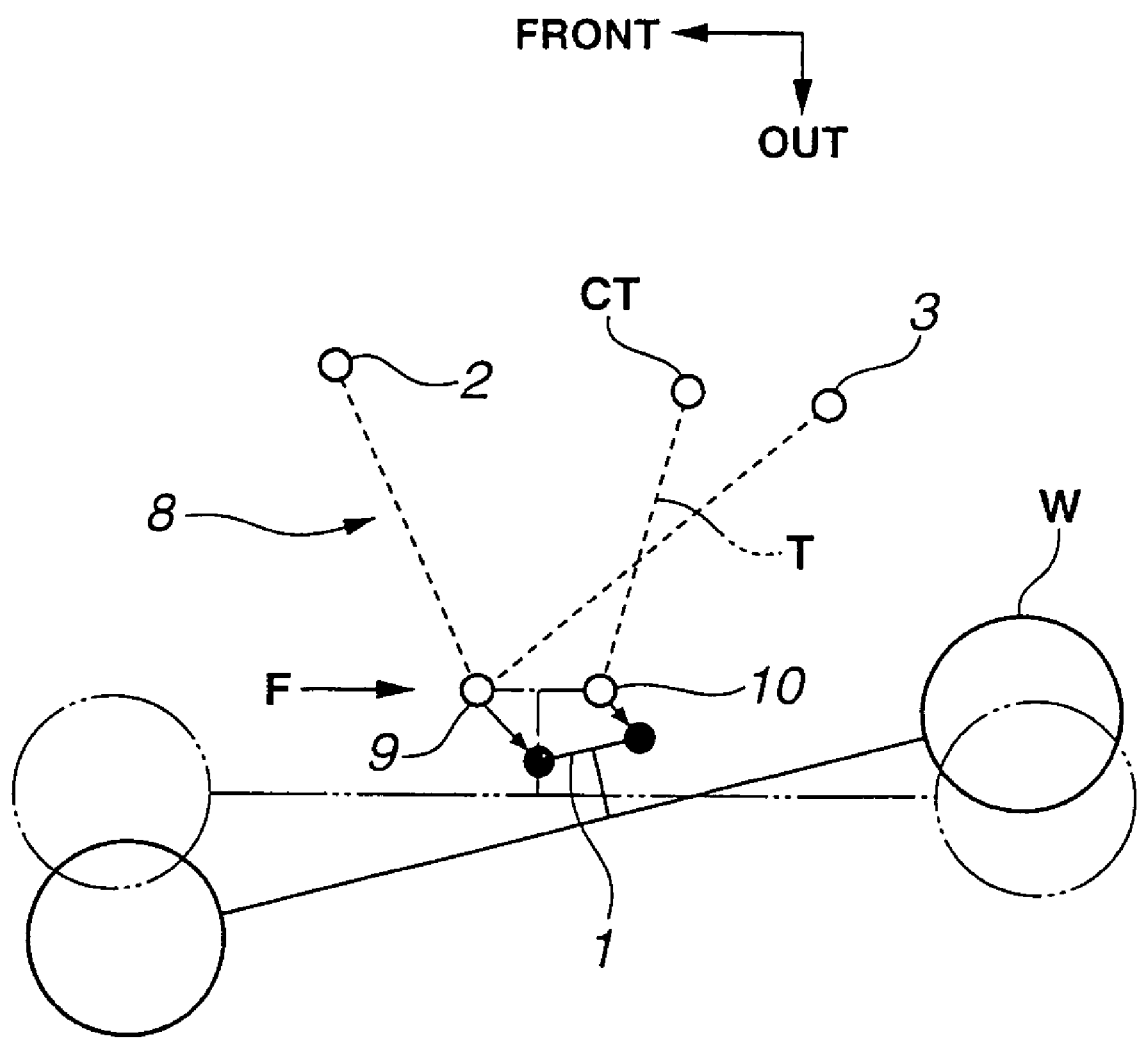
FIG. 6 is a view similar to FIG. 2, but illustrating a behavior of the axle and a wheel.

Referring to FIG. 6, there is shown a behavior of axle 1 and wheel W which results from the displacement of connection point 9 and connection point 10 as explained above. As illustrated in FIG. 6, connection point 9 between axle 1 and lower arm 8 and connection point 10 between axle 1 and tie rod T are displaced outwardly in the width direction of the vehicle to the positions as indicated by marks •, respectively. The displacement amount of connection point 9 is larger than that of connection point 10. As a result, axle 1 and wheel W can be prevented from having a tendency to toe-in and can develop a tendency to toe-out.

As described above, when the tendency to toe-in of axle 1 and wheel W is suppressed upon a braking operation in the vehicle, the vehicle develops a tendency of understeer during the steering operation so that the vehicle steering stability can be enhanced. Namely, by inclining central axis C2 of front pivot shaft 4 disposed at front connection point 2 between lower arm 8 and the vehicle body relative to central axis C3 of rear pivot shaft 5 in the toe-in direction of wheel W, connection point 9 between axle 1 and lower arm 8 can be largely displaced outwardly in the width direction of the vehicle as compared to connection point 10 between axle 1 and tie rod T upon the braking operation. This results in suppressing a tendency to toe-in of wheel W and therefore preventing a tendency to oversteer during a steering operation for the vehicle, thereby enhancing the vehicle steering stability.

Figure 7:
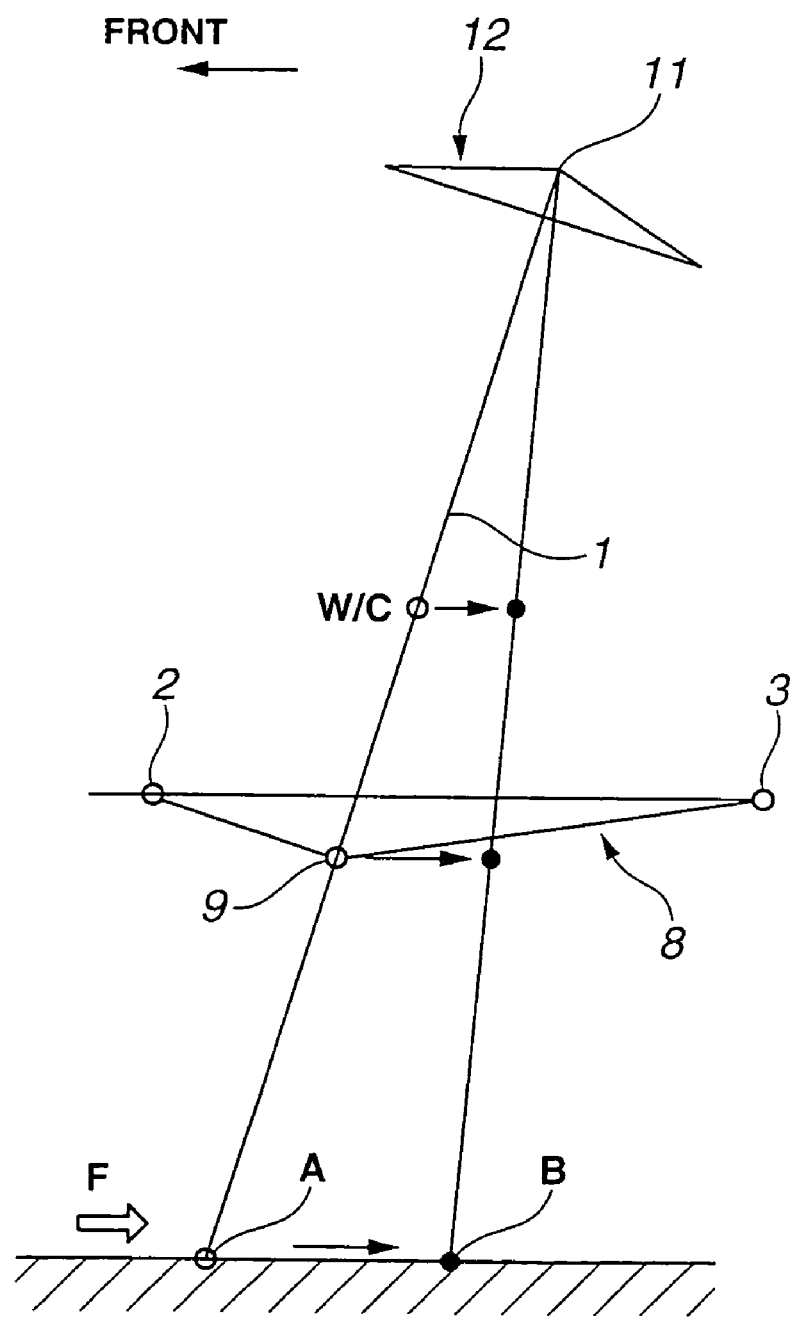
FIG. 7 is a schematic explanatory side view of an essential part of an independent suspension for a vehicle, of a second embodiment of the present invention, illustrating connection points between the axle, the lower arm and an upper arm and behavior thereof upon a braking operation.

Referring to FIG. 7, there is schematically shown a second embodiment of the independent suspension of the present invention as viewed from a side of the vehicle in the width direction thereof. As illustrated in FIG. 7, axle 1 is coupled to upper arm 12 at connection point 11. Upper arm 12 is connected to the vehicle body so as to be pivotally moveable in the vertical direction of the vehicle. An upper ball joint is disposed at connection point 11, whereby axle 1 is rotatably connected to upper arm 12. Similar to the first embodiment, axle 1 is rotatably connected to lower arm 8 through a ball joint that is disposed at connection point 9 between axle 1 and lower arm 8. Lower arm 8 is connected to the vehicle body at front and rear connection points 2 and 3. Bushings are disposed at respective connection points 2 and 3, which have small shear rigidity in a direction of central axes thereof as compared to compression rigidity in a radial direction thereof. A center of contact between a wheel and the ground is positioned at point A as shown in FIG. 7. Wheel center W/C on axle 1 is positioned between connection point 9 and connection point 11 on a straight line passing through connection point 9 and connection point 11. Meanwhile, the position of wheel center W/C is not limited to that in this embodiment and may be forward or rearward offset from the straight line extending between connection point 9 and connection point 11, in the fore-and-aft direction of the vehicle.

When force F directed rearward in the fore-and-aft direction of the vehicle is applied to the center of contact between the wheel and the ground upon the braking operation, a force directed in the same direction as that of force F is applied to connection point 9 between axle 1 and lower arm 8. Since the bushings at connection points 2 and 3 have the small shear rigidity as described above, connection point 9 is displaced rearward in the fore-and-aft direction of the vehicle to the position as indicated by mark • in FIG. 7. This causes axle 1 to pivot about connection point 11 rearward in the fore-and-aft direction of the vehicle. As a result, the center of contact between the wheel and the ground is displaced rearward in the fore-and-aft direction of the vehicle from point A to point B. Wheel center W/C on axle 1 also is displaced rearward in the fore-and-aft direction to the position as indicated by mark • in FIG. 7. The displacement amount of wheel center W/C is smaller than that of connection point 9.

Figure 8:
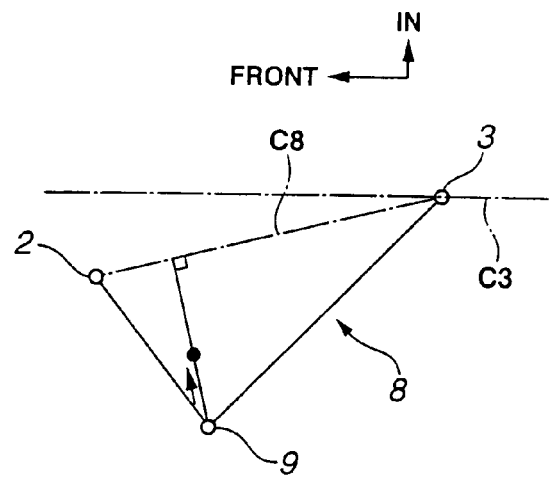
FIG. 8 is a schematic explanatory top plan view of an essential part of an independent suspension for a vehicle, of a third embodiment of the present invention, illustrating connection points between the axle, the lower arm and the vehicle body and displacement of the connection point between the axle and the lower arm upon a braking operation.
Figure 9:
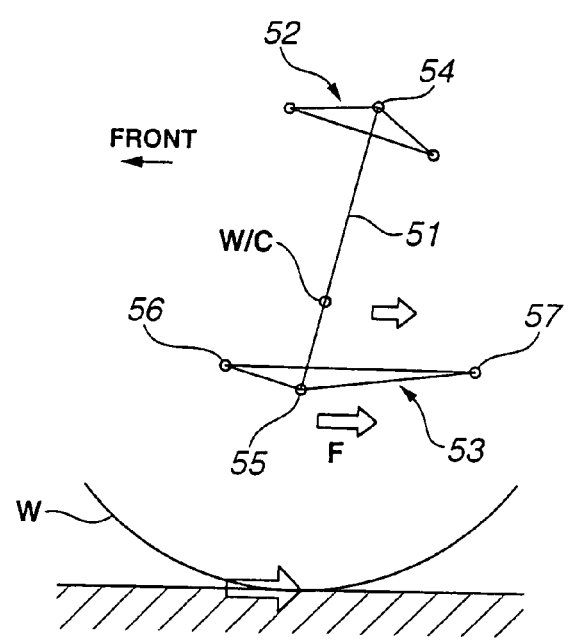
FIG. 9 is a schematic explanatory side view of a part of an independent suspension for a vehicle, of a conventional art.
Figure 10:
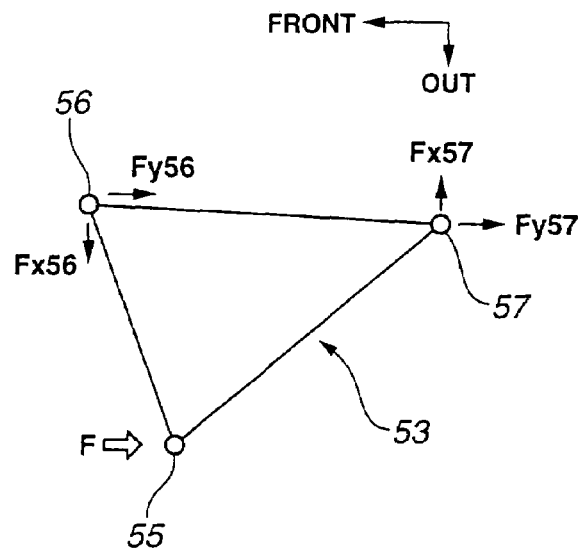
FIG. 10 is a schematic explanatory top plan view of the independent suspension shown in FIG. 9, illustrating forces applied to connection points between a lower arm, an axle and a vehicle body upon a braking operation.
Figure 11:
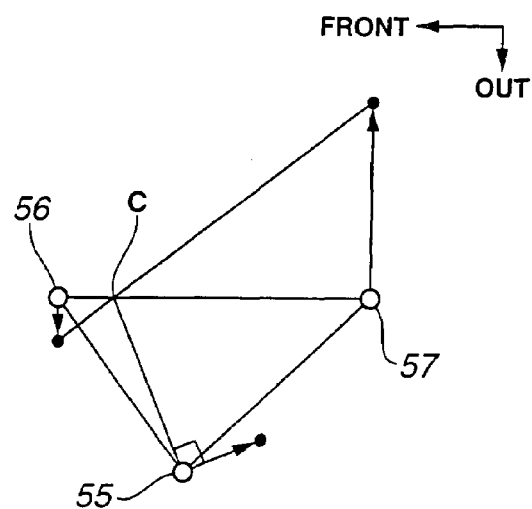
FIG. 11 is a schematic explanatory top plan view of the independent suspension shown in FIG. 9, illustrating displacement of the connection points between the lower arm, the axle and the vehicle body upon the braking operation.
Figure 12:
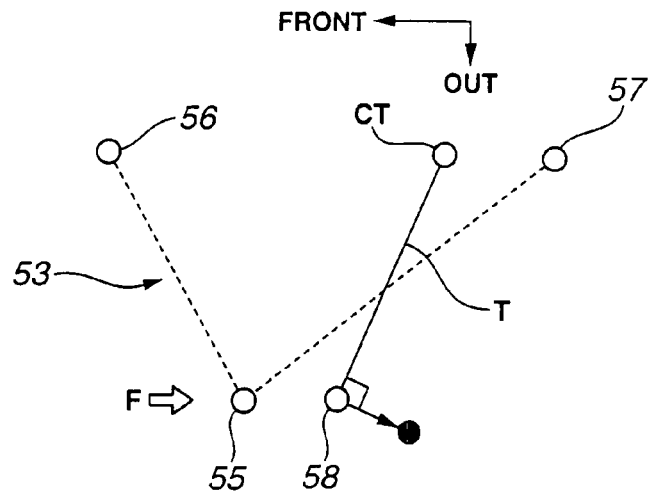
FIG. 12 is a schematic explanatory top plan view of the independent suspension shown in FIG. 9, illustrating displacement of connection points between the axle and a tie rod upon the braking operation.
Figure 13:
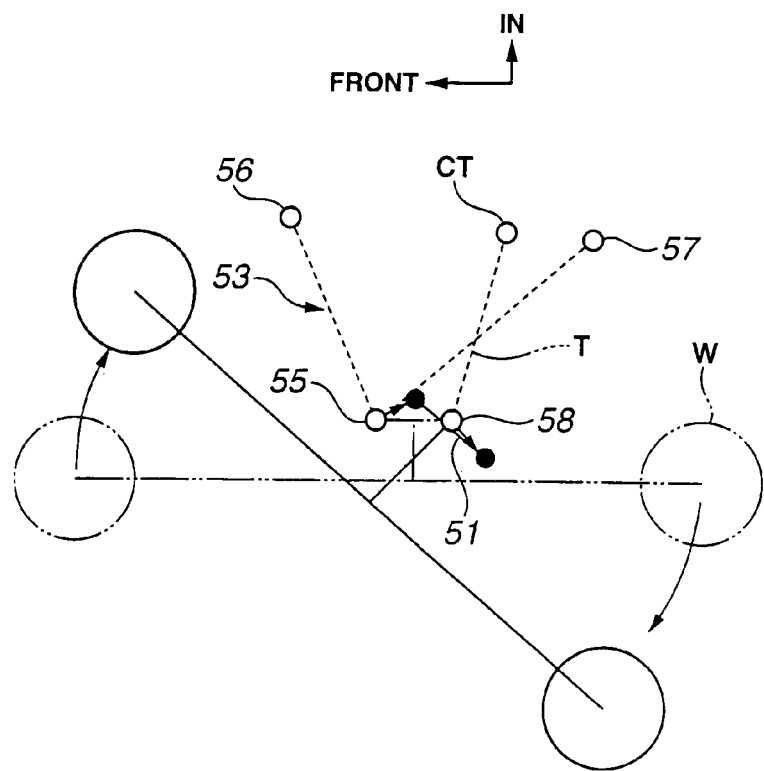
FIG. 13 is a schematic explanatory top plan view of the independent suspension shown in FIG. 9, illustrating a behavior of the axle and a wheel upon the braking operation.

Referring to FIG. 8, there is schematically shown a third embodiment of the independent suspension of the present invention when viewed from an upper side of the vehicle in the vertical direction thereof. As illustrated in FIG. 8, front connection point 2 between lower arm 8 and the vehicle body is positioned outwardly offset from central axis C3 of rear pivot shaft 5 at rear connection point 3 between lower arm 8 and the vehicle body, in the width direction of the vehicle. With this arrangement, center axis C8 of pivot of lower arm 8 about which lower arm 8 is pivotally moveable in the vertical direction of the vehicle is present on a line extending between front and rear connection points 2 and 3.

When the front side of the vehicle body is downwardly moved upon the braking operation and then the independent suspension on the front side thereof upwardly rebounds, lower arm 8 upwardly pivots about center axis C8. In this condition, connection point 9 between axle 1 and lower arm 8 moves on a straight line extending through connection point 9 perpendicular to central axis C8 when viewed in the horizontal plane. Connection point 9 is displaced to the position as indicated by mark • in FIG. 8 which is present on straight line. Connection point 9 is thus displaced forwardly in the fore-and-aft direction of the vehicle. As a result, the forward displacement of connection point 9 cancels a rearward displacement of connection point 9 which will be caused by a force applied to the wheel upon the braking operation. This can maintain a caster angle at a predetermined degree, thereby ensuring a desired self-aligning torque acting on the wheel and enhancing straight line vehicle stability.

This application is based on prior Japanese Patent Application No. 2004-208829 filed on Jul. 15, 2004. The entire contents of the Japanese Patent Application No. 2004-208829 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An independent suspension for a vehicle, comprising:
   an upper arm adapted to be connected to a vehicle body of the vehicle so as to be pivotally moveable in a vertical direction of the vehicle;

a lower arm adapted to be connected to the vehicle body of the vehicle at front and rear connection points spaced from each other in a fore-and-aft direction of the vehicle;

a front pivot shaft with a bushing, the front pivot shaft being disposed at the front connection point between the lower arm and the vehicle body, the front pivot shaft having a central axis passing through the front connection point between the lower arm and the vehicle body;

a rear pivot shaft with a bushing, the rear pivot shaft being disposed at the rear connection point between the lower arm and the vehicle body, the rear pivot shaft having a central axis passing through the rear connection point between the lower arm and the vehicle body, the lower arm being pivotally moveable about the central axes of the front and rear pivot shafts in the vertical direction of the vehicle;

an axle on which a wheel of the vehicle is rotatably supported and a wheel center is positioned, the axle being connected with the upper arm and the lower arm; and a tie rod connected with the axle at a connection point rearward of the wheel center in the fore-and-aft direction of the vehicle, wherein the central axis of the front pivot shaft is inclined relative to the central axis of the rear pivot shaft in a toe-in direction of the wheel.

2. The independent suspension as claimed in claim 1, wherein the front connection point between the lower arm and the vehicle body is outwardly offset from the central axis of the rear pivot shaft in a width direction of the vehicle substantially perpendicular to the fore-and-aft direction thereof.

3. The independent suspension as claimed in claim 1, wherein the bushings have a hollow-cylindrical shape and receive the front and rear pivot shafts, respectively, the bushings being disposed coaxially with the front and rear pivot shafts.

4. The independent suspension as claimed in claim 1, wherein the wheel center is rearwardly offset from a connection point between the lower arm and the axle in the fore-and-aft direction of the vehicle.

5. The independent suspension as claimed in claim 1, wherein the wheel center is positioned on a straight line passing through a connection point between the lower arm and the axle and a connection point between the upper arm and the axle.

6. An independent suspension for a vehicle, comprising:

an axle on which a wheel of the vehicle is rotatably supported and a wheel center is positioned;

a first link means for connecting the axle to a vehicle body of the vehicle at front and rear connection points spaced from each other in a fore-and-aft direction of the vehicle;

a first pivot means for supporting the first link means at the front connection point between the first link means and the vehicle body so as to enable the first link means to be pivotally moveable about a first central axis passing through the front connection point, the pivotal movement of the first link means about the first central axis being in a vertical direction of the vehicle;

a second pivot means for supporting the first link means at the rear connection point between the first link means and the vehicle body so as to enable the first link means to be pivotally moveable about a second central axis passing through the rear connection point, the pivotal movement of the first link means about the second central axis being in the vertical direction of the vehicle; and a tie rod connected with the axle at a connection point rearward of the wheel center in the fore-and-aft direction of the vehicle, wherein the first central axis is inclined relative to the second central axis in a toe-in direction of the wheel.

7. The independent suspension as claimed in claim 6, wherein the front connection point between the first link means and the vehicle body is outwardly offset from the second central axis in a width direction of the vehicle substantially perpendicular to the fore-and-aft direction thereof.

8. The independent suspension as claimed in claim 6, wherein the wheel center is rearwardly offset from a connection point between the first link means and the axle in the fore-and-aft direction of the vehicle.

9. The independent suspension as claimed in claim 6, further comprising a second link means for connecting the axle to the vehicle body so as to be pivotally moveable in the vertical direction of the vehicle.

10. The independent suspension as claimed in claim 9, wherein the wheel center is positioned on a straight line passing through a connection point between the first link means and the axle and a connection point between the second link means and the axle.

* * * * *